(12) United States Patent
Gao et al.

(10) Patent No.: US 10,704,645 B2
(45) Date of Patent: Jul. 7, 2020

(54) BIAS TOOTH FABRIC AND TOOTHED POWER TRANSMISSION BELT

(71) Applicant: Gates Corporation, Denver, CO (US)

(72) Inventors: Min Gao, Jiangsu (CN); Nigel Peter Blunsden, Dumfries (GB); Guogong Chen, Kunshan (CN); Shawn Xiang Wu, Rochester Hills, MI (US); Cynthia Decker, Columbia, MO (US)

(73) Assignee: Gates Corporation, Denver, CO (US)

( * ) Notice: Subject to any disclaimer, the term of this patent is extended or adjusted under 35 U.S.C. 154(b) by 282 days.

(21) Appl. No.: 15/841,193

(22) Filed: Dec. 13, 2017

(65) Prior Publication Data

US 2019/0178338 A1    Jun. 13, 2019

(51) Int. Cl.
| | | |
|---|---|---|
| *F16G 1/04* | (2006.01) | |
| *D03D 1/00* | (2006.01) | |
| *D03D 15/00* | (2006.01) | |
| *F16G 1/28* | (2006.01) | |
| *F16G 1/10* | (2006.01) | |
| *D02G 3/28* | (2006.01) | |
| *D03D 13/00* | (2006.01) | |

(52) U.S. Cl.
CPC ............. *F16G 1/04* (2013.01); *D03D 1/0041* (2013.01); *D03D 1/0094* (2013.01); *D03D 15/00* (2013.01); *F16G 1/10* (2013.01); *F16G 1/28* (2013.01); *D02G 3/28* (2013.01); *D03D 13/002* (2013.01); *D10B 2331/02* (2013.01); *D10B 2331/021* (2013.01); *D10B 2401/063* (2013.01); *D10B 2403/011* (2013.01); *D10B 2505/00* (2013.01)

(58) Field of Classification Search
CPC .. F16G 1/28; F16G 5/20; B29D 29/08; B29D 29/10; C08G 18/12
USPC .......................................... 474/205, 204, 266
See application file for complete search history.

(56) References Cited

U.S. PATENT DOCUMENTS

| | | | | |
|---|---|---|---|---|
| 2,519,590 A | * | 8/1950 | Mitchell | F16G 1/08 474/267 |
| 3,784,427 A | * | 1/1974 | Griffin | B29D 29/10 156/139 |
| 3,832,210 A | * | 8/1974 | Rohlfing | D06H 7/12 427/176 |
| 4,238,530 A | * | 12/1980 | Hollaway | B29D 29/00 26/96 |
| 4,343,666 A | * | 8/1982 | Wetzel | B29D 29/08 156/138 |
| 4,514,179 A | * | 4/1985 | Skura | F16G 1/28 474/204 |
| 4,632,665 A | | 12/1986 | Skura et al. | |

(Continued)

OTHER PUBLICATIONS

European Patent Office, International Search Report and Written Opinion of the International Searching Authority, International application No. PCT/US2018/058933, dated Feb. 18, 2019.

*Primary Examiner* — Henry Y Liu
(74) *Attorney, Agent, or Firm* — Paul N. Dunlap, Esq.

(57) ABSTRACT

A cover fabric for a power transmission belt, the fabric woven from warp yarns and weft yarns; the warp yarns and weft yarns each plied from a first filament yarn and a second filament yarn; the first filament yarn comprising higher tensile strength fibers than the second filament yarn; and the fabric woven in a modified twill pattern. A toothed belt with the cover fabric on the teeth, oriented on a bias, with the fabric having a bias angle less than 90°.

18 Claims, 4 Drawing Sheets

(56) References Cited

U.S. PATENT DOCUMENTS

| | | | | | |
|---|---|---|---|---|---|
| 4,907,323 | A * | 3/1990 | Smith | ................... | B26D 3/162 29/2.18 |
| 5,171,190 | A * | 12/1992 | Fujiwara | ................... | F16G 1/28 139/383 R |
| 5,255,419 | A * | 10/1993 | Stanislaw | ................ | D06C 3/02 26/74 |
| 5,529,545 | A * | 6/1996 | Isshiki | ..................... | F16G 1/28 474/205 |
| 6,086,500 | A * | 7/2000 | Yamada | .............. | D03D 1/0094 474/202 |
| 6,494,235 | B1 * | 12/2002 | Bruyere | .............. | D03D 13/002 139/11 |
| 6,595,883 | B1 * | 7/2003 | Breed | ..................... | F16G 5/06 156/137 |
| 6,605,014 | B2 * | 8/2003 | Isshiki | ..................... | F16G 1/28 428/172 |
| 7,056,249 | B1 * | 6/2006 | Osako | ...................... | F16G 1/06 474/260 |
| 7,909,720 | B2 * | 3/2011 | Burrowes | ................ | F16G 1/28 474/205 |
| 8,709,562 | B2 * | 4/2014 | Nguyen | ................... | D01F 6/04 428/222 |
| 2006/0174997 | A1 * | 8/2006 | Gibson | .................... | F16G 1/28 156/139 |
| 2007/0232429 | A1 * | 10/2007 | Knox | ....................... | F16G 1/28 474/205 |
| 2008/0004145 | A1 * | 1/2008 | Duke | .................... | B29D 29/08 474/205 |
| 2008/0032837 | A1 * | 2/2008 | Unruh | ..................... | F16G 1/28 474/143 |
| 2009/0227406 | A1 * | 9/2009 | Wu | ....................... | C08G 18/44 474/238 |
| 2010/0275764 | A1 * | 11/2010 | Egres, Jr. | ................. | B32B 5/12 89/36.02 |
| 2013/0034718 | A1 * | 2/2013 | Nair | ..................... | B29D 30/38 428/297.4 |
| 2015/0005123 | A1 * | 1/2015 | Di Meco | .................. | F16G 1/10 474/205 |
| 2016/0281818 | A1 * | 9/2016 | Newsome | .............. | B29D 29/08 |

* cited by examiner

BIAS TOOTH FABRIC AND TOOTHED POWER TRANSMISSION BELT

BACKGROUND OF THE INVENTION

This invention relates generally to toothed power transmission belts, more particularly to the use of bias woven two-component nonstretch fabric for the tooth covering for toothed belts, and specifically to a bias-oriented woven fabric for a tooth cover fabric wherein the warp and weft are blended aramid/nylon yarns, and the weave is a modified plain weave.

Toothed belts are used widely in automotive engine timing drives, and in various industrial power transmission applications. Toothed belts generally include an elastomeric body with a series of protruding teeth which mesh with matching grooved pulleys or sprockets. A tensile member is embedded in the belt body to restrict stretching and maintain tooth pitch. A tooth cover or jacket is provided to strengthen the teeth and provide abrasion resistance. The jacket is usually based on a cover fabric coated with one or more treatments such as adhesive dips, calendered coatings, and laminated layers.

U.S. Pat. No. 4,343,666 discloses a toothed belt with a tooth jacket made from a piece of fabric, which is wrapped circumferentially around the cylindrical mold body to form the jacket of the individual belts. The fabric may be square woven, biased, stress-relieved or stretchable. Preferably, the elongation of the fabric should be at least 60% to insure that the fabric will completely conform to the shape of the grooves, without undue strain or rupture.

U.S. Pat. No. 2,519,590 discloses bias-cut-fabric covered power transmission belts wherein warp and weft threads are disposed between 90 and 180° included angle and disposed between 47.5 and 75° with respect to the longitudinal axis of the belt. Belts such as V-belts are described wherein the entire rubber core of the belt is covered with fabric.

U.S. Pat. Nos. 4,632,665 and 4,514,179 disclose tooth covering that is preferably a balanced cloth fabric consisting of nontextured warp and weft yarns preferably bias-cut so that the warp and weft yarns each make an angle of between 30 and 60 degrees with respect to the longitudinal axis of the belt. Each yarn is made up of many filaments. In a preferred embodiment of the invention the cover consists of a wear-resistant fabric in which the warp and weft yarns are nylon and which is a "non-stretch" fabric. Also disclosed is a preforming method for making toothed belts.

U.S. Pat. No. 6,595,883 discloses a V-belt suitable for clutching applications with a textile component employing any suitable or conventional type of textile material including weaves of warp and weft threads at any desirable angle of any natural or synthetic variety. In a preferred embodiment the fabric is a nylon/cotton blend bias-fabric weave with warp at an angle of 100 to 130° to the weft, and both oriented in a direction of about 57°±7° to the direction of travel or longitudinal direction of the belt.

U.S. Pat. No. 7,909,720 discloses a tooth cover may be of any desired configuration, including conventional weave with warp and weft and including cut on a bias, and using any of a laundry list of materials. The cloth canvas layers may be cloth made by plain weaving, twill weaving, satin weaving, or the like, using threads formed from cotton, polyamide fiber, polyethylene terephthalate fiber, or aramid fiber. The preferred embodiment utilizes nylon-66 woven stretch fabric. The only embodiment in the examples uses a single ply cotton canvas layer treated with an RFL solution.

U.S. Pat. Publ. No. 2009/0227406 A1 discloses a tooth cover may be of any desired configuration, including conventional weave with warp and weft and including cut on a bias, and using any of a laundry list of materials. The preferred embodiment disclosed, and the only embodiment in the examples, utilizes tooth fabric of nylon-66 woven fabric laminated with polyethylene film on the external tooth surface.

U.S. Pat. No. 3,784,427 discloses a method of making and treating bias cut fabric suitable for V-belt covers and hose reinforcing.

U.S. Pat. No. 3,832,210 discloses a method of preparing bias cut fabric related to helically cutting strips of bias fabric from a length of tubular fabric.

U.S. Pat. No. 4,238,530 discloses a method for producing continuous, spliceless bias fabric wherein warp and weft threads are disposed between 90 and 150° included angle.

U.S. Pat. No. 4,907,323 discloses a slitting method and apparatus for making bias fabric.

U.S. Pat. No. 5,255,419 discloses tentering apparatus and a related method.

U.S. Pat. No. 6,494,235 discloses a method and weaving machine for continuously making bias-bound fabric applicable to engineering fabrics based on flat yarns.

U.S. Pat. Publ. No. 2010/0275764 discloses a woven fabric from yarns used in the manufacture of ballistic projectile or puncture resistant articles.

U.S. Pat. Nos. 6,605,014 and 4,343,666 also disclose methods of making toothed power transmission belts including various tooth preform methods.

It is not known or suggested to use a bias-oriented woven fabric for a belt tooth cover fabric wherein the warp and weft are blended aramid/nylon yarns and the weave is a modified plain weave or a modified twill weave or a modified satin weave.

SUMMARY

The present invention is directed to systems and methods which provide a belt with a cover fabric, or provides a bias-oriented woven fabric for a belt tooth cover fabric wherein the warp and weft are a blended yarn. The weave may be a modified plain weave with one or more plain weave rows alternating with one or more twill or satin weave rows. The plain weave rows may be preferably be 1/1 or 1/2 weaves. The satin or twill weave rows may preferably be 1/3, 2/4, or 1/4 weaves. The overall weave pattern may be a broken twill or modified satin, or a crow's foot pattern. The weave may be a modified twill weave or a modified satin weave.

The blended yarn may a plied yarn of two or more different individual filament yarns. The warp and weft yarns may be balanced. The different individual filament yarns may be aramid and nylon. The aramid may be para-aramid or copolymer aramid. The nylon may be nylon 66, nylon 46, or the like. The plied yarn may have a final twist of about 1 to about 5 twists/cm.

The first individual filament yarn of the blended yarn may be any suitable high-performance fiber, e.g., of high tensile strength or high temperature resistance. The second individual filament yarn of the blended yarn may be any suitable highly flexible and abrasion resistant fiber. Additional yarns may be included.

The fabric is preferably a bias fabric with a bias angle less than 90°, or from 40° to 89°.

The fabric is preferably woven or processed so that one side is relatively smooth and the other side is relatively rough.

The fabric may be post-processed or have a treatment applied.

The invention is also directed to a belt having the cover fabric. The belt may a toothed belt with the fabric oriented on a bias and covering the teeth. The toothed belt may be made using a tooth preform process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
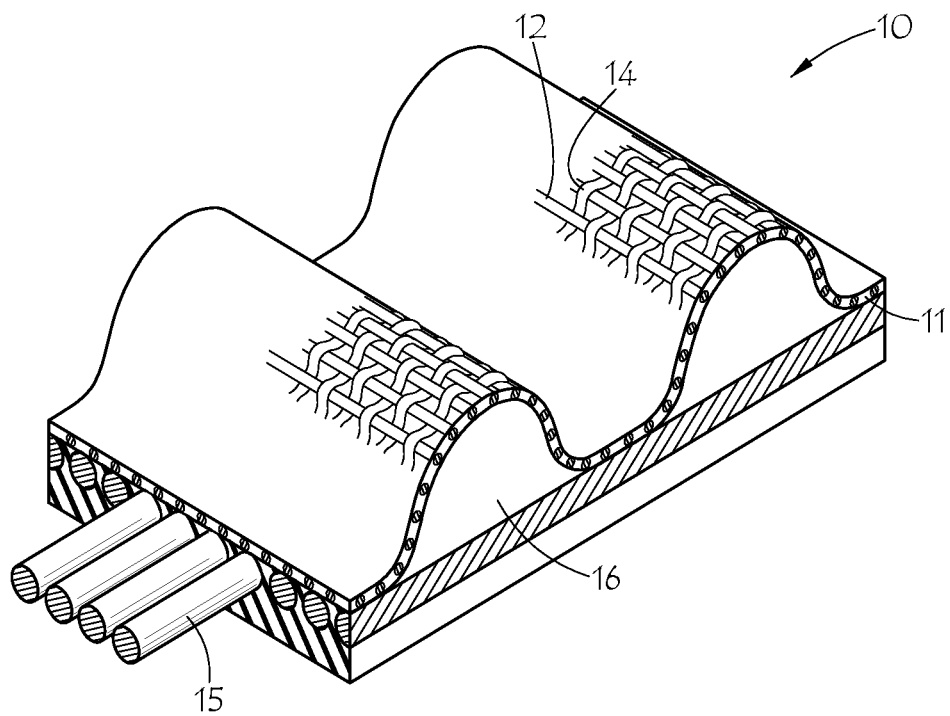
FIG. 1 is a partially fragmented perspective view of a toothed belt according to prior art.

This invention relates to synchronous belts, also called timing belts, or toothed belts. FIG. 1 shows a toothed belt according to the prior art. In FIG. 1, toothed belt 10 has protruding transverse teeth 16 the surface of which are covered by fabric 11. Also shown are reinforcing tensile members 15 running in the longitudinal direction of the belt. Fabric 11 is shown as a conventional woven fabric with warp 12 and weft 14. Typically, weft 14 is oriented in the longitudinal belt direction and is made of a highly stretchable yarn construction. Warp 12 is generally oriented in the transverse direction of the belt and need not be stretchable, or even very high in tensile strength. The conventional fabrics are thus highly unbalanced. One common fabric constructions uses nylon 66 fibers in both the warp and weft, with the weft highly textured or crimped to provide the necessary stretchability, and with a 2/2 twill weave.

Figure 2:
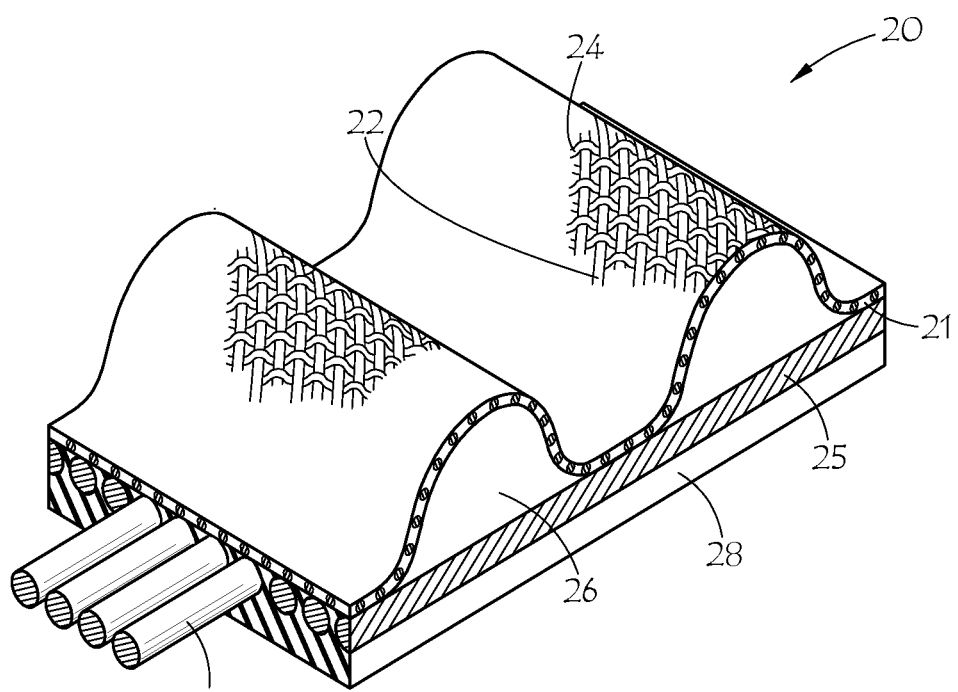
FIG. 2 is a partially fragmented perspective view of a toothed belt according to an embodiment of the invention.

FIG. 2 shows a toothed belt according to an embodiment of the invention. In FIG. 2, inventive toothed belt 20 has protruding transverse teeth 26 the surface of which are covered by fabric 21. Also shown are reinforcing tensile members 25 running in the longitudinal direction of the belt. Fabric 21 is shown as a bias-cut, woven fabric with warp 22 and weft 24. By bias-cut is meant the fabric is oriented on the bias, i.e., with the warp and weft both at approximately equal and opposite angles to the longitudinal direction of the belt. The bias fabric may advantageously be balanced, i.e. with the same yarn construction used in both warp and weft. A preferred construction is a blend yarn combining desirable properties of two or more individual, distinct yarn materials, such as a yarn having a high temperature and heat resistance combined with a yarn having a abrasion resistance or high affinity for adhesion belt body materials. Belt 20 may optionally have a back fabric on the side opposite the teeth, (not shown in FIG. 2). In some embodiments the balanced woven tooth cover fabric of blended yarn may be oriented with warp or weft parallel to the longitudinal direction of the belt. The rubber of the tooth 26 and that of the backside 28 of belt 20 may be the same or different, as may the rubber surrounding the tensile members 25. These rubber materials may be any suitable elastomer or rubber composition(s) known in the art.

Figure 3:
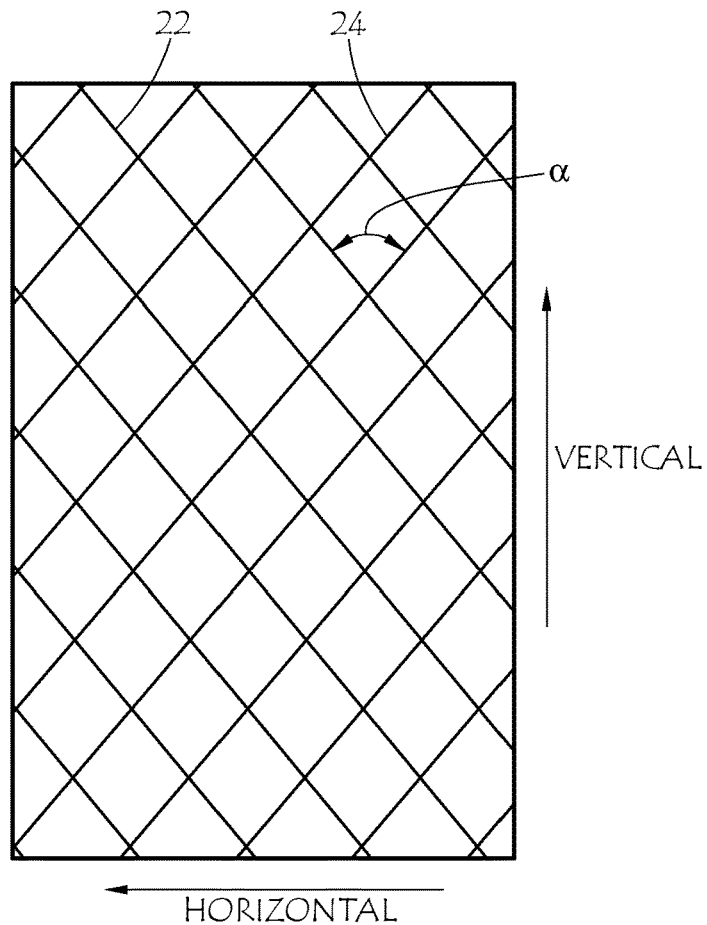
FIG. 3 is a schematic showing aspects used in describing fabrics of the invention.

FIG. 3 illustrates some useful aspects describing fabrics of the invention. The bias angle, $\alpha$, is defined as the included angle between the warp yarns and the weft yarns. The vertical direction of the fabric is defined as the direction generally bisecting the bias angle, and this is also the direction that will be oriented in the longitudinal direction of the belt. For a balanced fabric, there is some arbitrariness to the direction of the warp and weft, but warp and weft generally refer to the directions of the yarns in the weaving process producing the bias fabric. The fabric may be produced by conventional flat weaving, with the warp yarns running in the weaving machine direction and the weft yarns crossing the warps, followed by a process of diagonal cutting, and possibly adjusting the bias angle and/or sewing or otherwise attaching two or more bias cut pieces together to make a desired length. Alternately, the fabric may be produced in a conventional double-layer, flat weaving process with the edges woven together, i.e. weaving a flattened tube, followed by helical slitting. Alternately, the fabric may be produced by circular weaving a tube, with the warp yarns running in the machine direction and the weft yarns running circumferentially around the tube, followed by helically slitting the tube to obtain continuous bias fabric of any desired length. Depending which side of the fabric is placed facing outward on belt 20, and which direction the fabric was bias-cut, the warp yarns may run in either of the warp or weft directions that are indicated in FIG. 3. Alternately, the fabric may be produced by weaving on the bias, in which case, depending on the weaving process, there may be no clear distinction between the warp and weft yarns.

The fabrics described herein are typically woven with the warp and weft yarns at right angles to each other. The desired bias angle may be achieved in a subsequent process by any known means in the art. The bias angle may be in the range of greater than 60°, or greater than 75°, or between 60 and 90°, or between 75 and 85°, based on the bias angle as woven, before a tooth preforming operation. In this range, the bias fabric will have a little bit of stretch, sufficient to aid good tooth formation in a preformed-tooth, belt-making process. It should be noted that this small amount of stretch comes from the bias arrangement, i.e., from rearrangement of the yarns as the fabric is stressed. The preferred yarns to be described in more detail below may be plied multicomponent filament yarns without crimp and with no conventional elastic (e.g. polyurethane or rubber) core, making the yarns themselves nonstretchable as the term would be used the textile art. After belt making, the bias angle may then be observed to have shifted somewhat, for example reduced by a few degrees, for example to less than 90°, less than 80°, less than 75°, or less than 60°, or to between 40° and 89° or between 50° and 89°.

Figure 4:
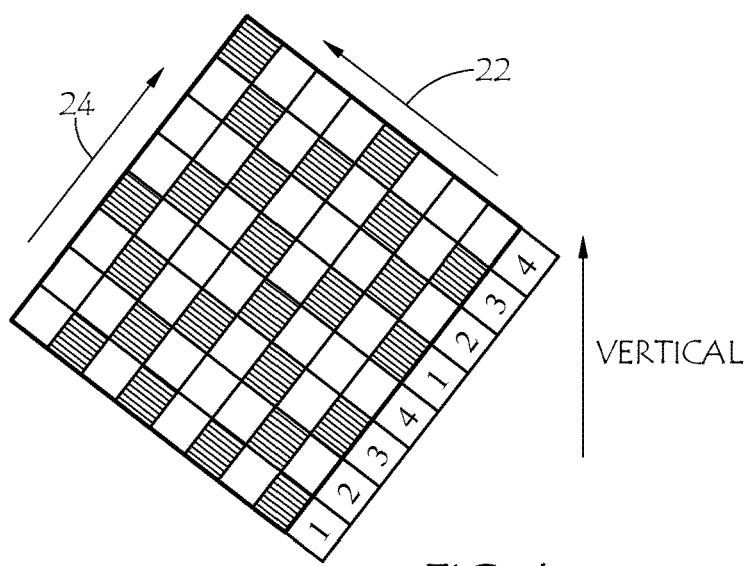
FIG. 4 is a fabric weave diagram for Ex. 4 according to an embodiment of the invention.

FIG. 4 is a fabric weave diagram according to an embodiment of the invention. In this and other weave diagrams shown herein, as is customary in the art, the squares represent yarn crossings between warp and weft. The color of the square indicates whether the top, or visible, yarn at the crossing is a warp or weft yarn. Dark or shaded squares indicate the warp yarn is visible or on top of the weft. Light squares indicate the weft is on top of the warp. Conventionally, the warp yarns run upward in the diagram, and the weft yarns from side to side. To illustrate the bias orientation of the fabric, in FIG. 4, warp yarns 22 are indicated by an arrow running up and to the left. Herein, "up" refers to the vertical direction shown in the figure, which generally, will be the longitudinal direction in the belt. Although these fabrics may actually be woven vertically, for example, on a circular loom or on a conventional flat loom, the terms "up" and "vertical" used herein are not so limited, but are merely used for convenience. As indicated in FIG. 4, the weft yarns 24 run up and to the right. The fabric of FIG. 4 may be considered a modified plain weave, in which every other row is a 1/1 plain weave with alternating rows being a 1/3 satin or twill weave. The warps are numbered 1 through 4, and it may be noted the repeat unit is a 4×4 section of the diagram. Since the surface shows more weft than warp, the fabric of FIG. 4 may also be called an uneven, weft-faced (or filling-faced) modified twill weave.

Figure 5:
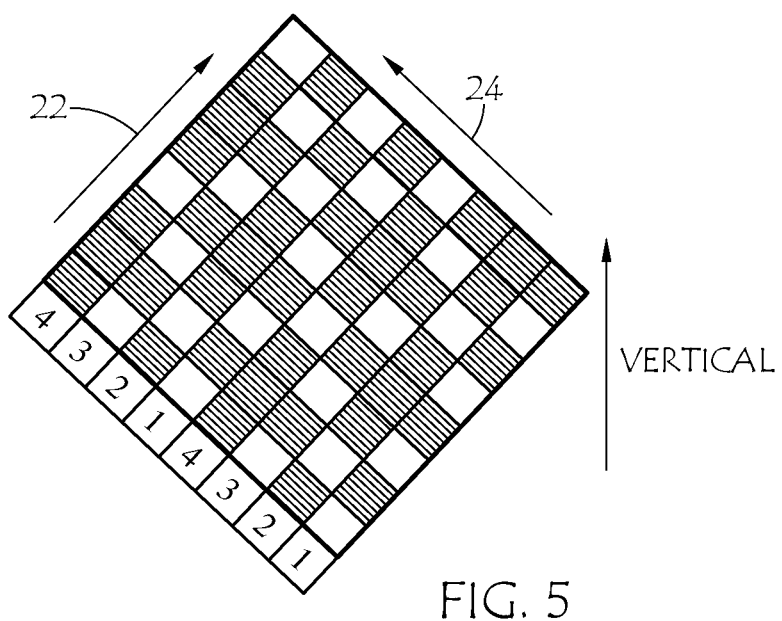
FIG. 5 is a fabric weave diagram of the opposite side of the fabric of FIG. 4.

FIG. 5 is a fabric weave diagram of the reverse side of the fabric of FIG. 4, flipped about the vertical axis. Now the warp direction 22 is up and to the right, and the weft direction 24 is up and to the left. On the reverse side, more warp shows than weft. Preferably, the fabric may be woven so the reverse side is rougher than the other, smoother side.

Figure 6:
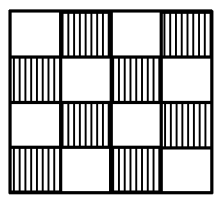
FIG. 6 is a fabric weave diagram for Ex. 1 according to another embodiment of the invention.

FIG. 6 is a fabric weave diagram according to another embodiment of the invention. FIG. 6 shows the fabric oriented as it might be woven, but it should be understood it may be rotated and used on the bias in the belt, as has been shown in FIGS. 2-5. FIG. 6 shows the weave may be a 1/1 plain weave.

Figure 7:
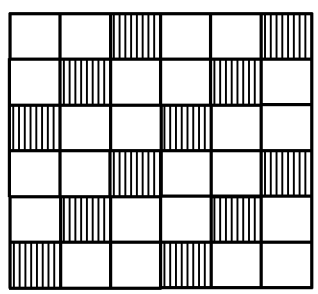
FIG. 7 is a fabric weave diagram according to another embodiment of the invention.

FIG. 7 is a fabric weave diagram according to another embodiment of the invention. FIG. 7 shows the weave may be a 1/2 uneven twill weave. The 1/2 twill weave may be a weft-faced twill as shown in FIG. 7, or a warp-faced 2/1 twill (not shown). Likewise, any of the weaves described herein could be left-handed twills or right-handed twills, meaning the twill pattern could proceed up and to the left, or up and to the right, whether modified or not.

Figure 8:
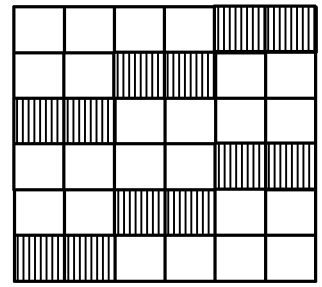
FIG. 8 is a fabric weave diagram according to another embodiment of the invention.

FIG. 8 is a fabric weave diagram according to another embodiment of the invention. FIG. 8 shows the weave may be a 2/4 weft-faced twill weave, or alternately a 4/2 warp-faced twill weave (not shown).

Figure 9:
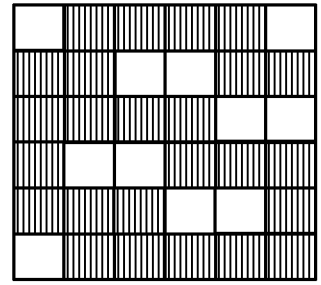
FIG. 9 is a fabric weave diagram according to another embodiment of the invention.

FIG. 9 is a fabric weave diagram according to another embodiment of the invention. FIG. 9 shows the weave may be another kind of 2/4 satin weave. It may be noted that such higher order weave numbers may be carried out in multiple ways, depending on the pattern shift from row to row.

Figure 10:
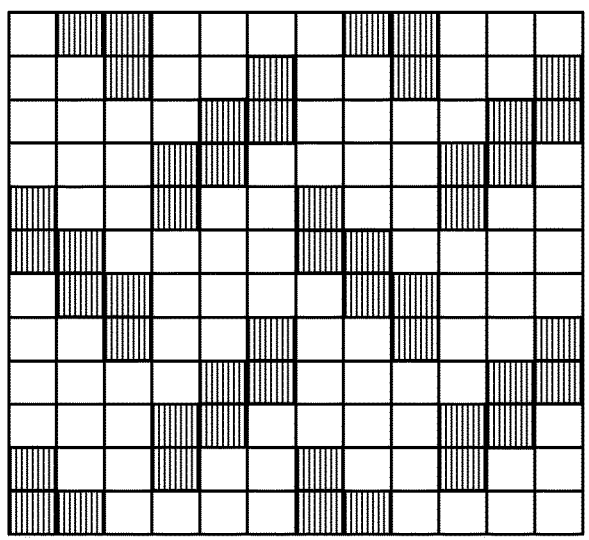
FIG. 10 is a fabric weave diagram according to another embodiment of the invention.

For example, FIG. 10 shows another example of a 2/4 modified twill or modified satin wherein the pattern shifts produce a crow's foot pattern. Every third row of FIG. 10 is a 1/2 pattern.

Figure 11:
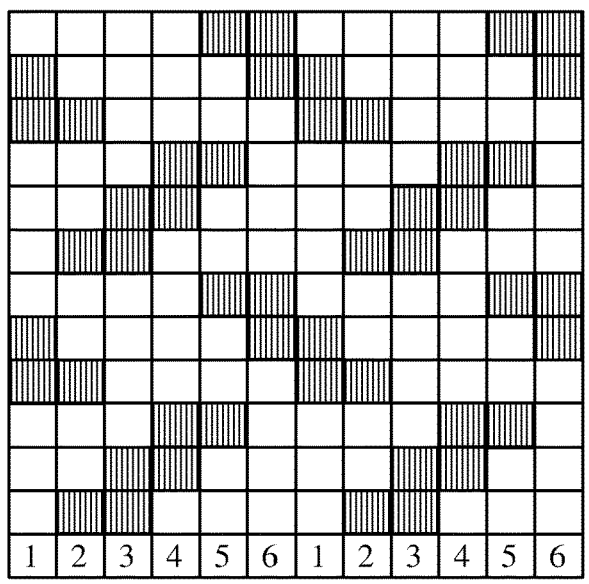
FIG. 11 is a fabric weave diagram for Ex. 3 according to another embodiment of the invention.

FIG. 11 is an alternate form of the modified 2/4 twill of FIG. 10, based on rotating the pattern 90° (i.e., switching warp and weft). Here, every row is a 2/4 row, and a similar crow's foot or broken twill pattern is seen.

Figure 12:
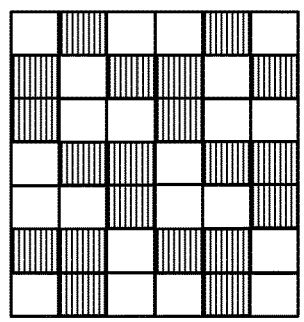
FIG. 12 is a fabric weave diagram for Ex. 2 according to another embodiment of the invention.

FIG. 12 is an alternate form of the 1/2 twill of FIG. 7. FIG. 12 shows an even, modified 1/2 twill, based on every other row being 2/1. So 1/2 rows alternate with 2/1 rows.

The weaves shown in FIGS. 4-12 are meant to be illustrative and not limiting. The invention may be practiced with any suitable weave, including plain or square weaves, basket weaves, twill weaves, satin weaves, and various combinations and variations thereof. Preferably, the weave may be a combination of rows of square weave alternating with rows having extended runs of either the warp or weft as in a satin weave. By extended runs (or satin weaves) is meant a warp (or weft) yarn crosses over two or more, preferably three or more, or four or more, weft (or warp) yarns before going under the next weft (or warp) yarn. The extended runs may create a weft-faced (or warp-faced) fabric and contribute to the smoothness of the surface, which is believed to be advantageous for abrasion resistance. At the same time, it is believed advantageous for adhesion to the belt body to make the opposite side of the fabric rougher than the smooth side. Different weaves, as described above, may advantageously result in different fabric thicknesses, for a given yarn weight. Thus it is possible to select the weight of yarn and weave pattern that provides the best fabric thickness or weight for a given belt application. For example, such selection may be used to affect the cord position in the belt or to give a desired pitch line.

The fabrics of the invention advantageously include blend yarns of two or more individual yarns of different materials. The individual yarns making up the blend yarn are preferably not textured or crimped or elastic or highly stretchable in nature. The individual yarns may be lightly twisted (i.e., a "first twist"), up to several twists per cm, but are preferably not twisted (i.e., "zero twist"). The blended yarns which are used for the warp and weft yarns may be plied, i.e., the individual yarns may be twisted together to form the blended yarns, preferably with a twist of up to several twists per cm (i.e., a "final twist" or a "ply twist"). The final twist may be in the range of 1 to 5 twists/cm, or 2.0 to 4.0 twists/cm.

One of the two or more individual yarns used to form the blend yarns may be a high performance yarn, for example a high temperature resistant material, such as aramid, polyetheretherketone, poly(p-phenylene-2,6-benzobisoxazol (PBO), polyphenylenesulfide (PPS), polyimide (PI), or the like. The aramid may be para-aramid, meta-aramid, or an aramid copolymer. A second of the two or more individual yarns may be a high performance yarn with another desired property, such as of high abrasion resistance or high adherability to other belt materials, such as nylon (PA), polyester, polyethylenenaphthalate (PEN), ultra-high-molecular-weight polyethylene (UHMWPE), or the like. The nylon may be, for example, nylon 66, nylon 6, nylon 46, or the like. By combining two or more individual yarns in this way, the resulting fabric may be more versatile than a single-material fabric, meeting multiple requirements which might be impossible for a single material to meet. For a two-component blended yarn, the amount of the first individual yarn may preferably be in the range of 10% to 90%, or 25% to 75%, or 1/3 to 2/3, or between 50% and 75% of the total denier of the blended yarn, with the balance being the second individual yarn. In a preferred embodiment the blended yarn is less than 50% nylon or less than 50% nylon 66.

A preferred blended yarn has an aramid yarn and a nylon yarn twisted together, and this blend yarn may be used for both the warp and weft of the bias fabric. The aramid may preferably be para-aramid or copolymer aramid. Suitable para-aramid fibers include Kevlar® fibers from E. I. du Pont de Nemours and Company, Twaron™ fibers from Teijin Aramid B.V., and Taparan® fibers from Yantai Tayho Advanced Materials Co., Ltd. Suitable copolymer aramid fibers include Technora™ fibers from Teijin Aramid B.V. The nylon may preferably nylon 66. Nylon yarns are available as nylon partially oriented yarn ("POY"), nylon fully drawn yarn ("FDY"), and drawn textured yarn ("DTY"). Although any type may be useful, for tough belt applications, FDY nylon is preferred. The amount of the aramid may preferably be more than 50%, or in the range of 25% to 75%, or 1/3 to 2/3, or 55% to 75% of the total denier of the blended yarn, with the balance being the a nylon such as nylon 66. In the preferred range, the blended yarn has a good balance of high strength from the aramid and good abrasion resistance from the nylon. The final twist is advantageously in the range of 1 to 5 twists/cm. Higher twist could compromise tensile strength, while lower twist could compromise abrasion resistance. For less demanding belt applications, the amount of the higher performance and higher cost yarn could be reduced and more nylon or other cost yarn could be used.

Although not necessary, a third yarn or other additional yarns or fibers may be included in the blended yarn used to make the fabric. Such additional fibers could be any staple or continuous fiber with a desired property, including natural or synthetic, organic or inorganic fibers. As an example, some elastic filament could be added to provide a desired amount of stretch. Other fibers could be added for bulk or for cost reduction.

The inventive fabrics preferably exhibit two sides or surfaces with different characteristics. One side is relatively smooth while the other side is relatively rough. This is an important difference from conventional bias fabric. For best toothed belt performance, the smooth side of the fabric may be used for the outer tooth surface side, which will contact the sprockets or pulleys of the drive system and provide good wear resistance, while the rough side will reside at the interface with the tooth material, providing good mechanical adhesion with the tooth materials or adhesive coatings.

After weaving of the bias fabric of the invention, various post-weaving processes or treatments may advantageously be used. Any known post-weaving process may be used as needed. Such processes include washing, heat setting, sizing, dip or spray treating, and the like. Heat setting processes may also be used to adjust the bias angle. This is done by controlling the width or tension during setting. The width control may also be important during treating processes. For example, a coating or treatment may be useful to lock the warp and weft yarns in position, or to improve the tooth loading capacity, environmental resistance, or wear resistance. Such a coating may be for example, one or more of an RFL (resorcinol-formaldehyde-latex), other latex-based coating, rubber cement, polyurethane, epoxy, including rubber-modified or lubricant-modified coatings.

The thickness of the inventive bias fabric will depend on the denier of the yarns it is woven from, as well as the details of the weave, and can be chosen as needed for a particular belt design. For some common belt applications, the thickness may be in the range of about 0.030 to 0.045 inch. Others may be from 0.5 mm to 0.9 mm or up to 1.5 mm.

The bias fabrics of the invention may thus be very strong in both (or all) directions in the belt, very abrasion resistant, and can be adhered to the outer surface of a toothed belt. However, they are also very high in modulus, i.e., not very stretchy, so they require a preformed tooth process for making the belts. The result is that the fabrics provide a high degree of reinforcement of the tooth, especially when matched with very stiff tooth materials, such as fiber-reinforced rubbers or high-durometer polyurethanes. The belts of the invention are thus suitable for carrying higher loads than prior belt designs per unit width. Embodiments of the belts of the invention are also found to reducing timing error in synchronous belt drive systems when compared to prior art belts.

While mainly designed for tooth covering fabric for high, tooth-load-capacity timing belts, the inventive fabrics may also be used as back fabrics for the reverse side of any kind of belt, wrapping fabrics for wrapped belts, such as V-belts or round belts, or friction-surface fabrics for the pulley contact surface of any kind of belt. While the bias orientation is preferred for high-load timing belt tooth covers, other orientations may be used depending on the needs of the application.

EXAMPLES

Ex. 1 is a 1/1-woven, bias, aramid fabric, produced by helically slitting a 1/1 square woven (plain weave) tube. Both warp and weft yarns are a plied blend of 840 denier Taparan® para-aramid yarn from Tayho and 210 denier nylon 66 FDY yarn, thus 80% aramid and 20% nylon based on the total denier. FIG. 6 illustrates the weave pattern of Ex. 1.

Ex. 2 is a 1/2-twill, woven, bias aramid fabric. Both warp and weft yarns are a plied blend of 840 denier Taparan® para-aramid yarn from Tayho and 210 denier nylon 66 FDY yarn, thus 80% aramid. FIG. 12 illustrates the weave pattern of Ex. 2.

Ex. 3 is a 2/4-modifed twill, resembling a crow's foot satin, woven, bias aramid fabric. Both warp and weft yarns are a plied blend of 840 denier Taparan® para-aramid yarn from Tayho and 210 denier nylon 66 FDY yarn, thus 80% aramid. FIG. 11 illustrates the weave pattern of Ex. 3.

Ex. 4 is a modified plain weave combining 1/1 plain and 1/3 satin weaves. Both warp and weft yarns are a plied blend of 840 denier Taparan® para-aramid yarn from Tayho and 420 denier nylon 66 FDY yarn, thus 2/3 aramid and 1/3 nylon. FIG. 4 illustrates the weave pattern of Ex. 4.

Ex. 5 has the same weave as Ex. 4, but with a different aramid yarn. Ex. 5 uses 800 denier Technora™ copolymer aramid yarn from Teijin. The yarn is thus about 65.6% aramid and about 34.4% nylon. The raw fabric, in the vertical direction, has a yarn angle of about 80 degrees.

Ex. 6 is the same fabric as Ex. 5, but with an epoxy treatment.

Comp. Ex.7 is a conventional 2/2 twill woven stretch fabric with aramid and nylon wrapped around a polyurethane elastic yarn for the warp and 210 denier nylon 66 yarn for the weft.

Comp. Ex. 8 is the similar to Comp. Ex. 8, except the warp and weft yarn materials are interchanged.

TABLE 1 shows properties of the example fabrics listed above. The tensile properties of the inventive fabrics are much more uniform in all directions tested than the comparative fabrics. There is practically no stretch in the warp and weft directions for the inventive example fabrics, and the elongation in the vertical and horizontal directions is attributed to the rearrangement of the weave under stress. The comparative fabrics have the usual relatively high stretch in either the weft or the warp direction. The inventive fabrics are also notably stronger than the comparative fabrics. This is even more impressive considering the inventive fabrics have significantly lower thread count and thickness than the comparative fabrics. Thus, the inventive fabrics can pack more strength and reinforcement into a smaller belt package (e.g. smaller belt width) than the comparative fabrics.

Note that the thickness can be varied by choice of weave. Ex. 1-5 use the same blended yarns, but result in a wide range of fabric thickness. This capability may be useful for designing various belt constructions, such as for achieving a desired pitch line.

The abrasion resistance test was carried out in accordance with GB/T21196.2-2007 with metallographic sandpaper 1#W28 as the abrasive material and at a load of 595 g. Note that Ex. 1-4 were woven with the same appearance on both sides, thus resulting in about the same abrasion resistance on both sides. Ex. 5 and 6 were woven to be smoother on one side than the other, resulting in superior abrasion resistance on the smooth side, and superior adhesion to tooth rubber on the rough side. For example, a peel adhesion test showed that the rough-side adhesion for Ex. 5 and 6 averaged 100 N/inch width, while the smooth side adhesion average 59 N/inch, and the adhesion for a conventional aramid stretch fabric averaged 75 N/inch.

Based on the abrasion test results in TABLE 1, Ex. 5-6 was chosen for making some test belts for evaluating adhesion, tooth stiffness, belt durability, and timing drive system performance. Preliminary results indicate the fabric adhesion to the tooth rubber is good. The belts are expected to perform well in terms of durability, timing error, and the like.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A cover fabric for a power transmission belt, said fabric woven from warp yarns and weft yarns; said warp yarns and weft yarns each plied from a first filament yarn and a second filament yarn; said first filament yarn comprising higher tensile strength fibers than said second filament yarn; and said fabric woven in a modified twill pattern.

2. The cover fabric of claim 1 wherein the modified twill pattern comprises one or more rows of 1/1 or 2/1 plain weave alternating with one or more rows of a 1/3 or 1/4 or 2/4 satin weave.

3. The cover fabric of claim 1 wherein said warp yarns and weft yarns are each plied with a final twist in the range of 1.0 to 5.0 twists per cm.

TABLE 1

| Fabric Properties | Ex. 1 | Ex. 2 | Ex. 3 | Ex. 4 | Ex. 5 | Ex. 6 | Comp Ex. 7 | Comp Ex. 8 |
|---|---|---|---|---|---|---|---|---|
| tensile strength (N/50 mm) | | | | | | | | |
| warp direction | 7738 | 7166 | 7703 | 5875 | 6519 | 5723 | 5323 | 1831 |
| weft direction | 6418 | 8323 | 8617 | 7865 | 7093 | 6791 | 1698 | 4736 |
| vertical direction | 10843 | 11894 | 12542 | 8962 | 8761 | 7630 | — | — |
| horizontal direction | 9102 | 10005 | 10559 | 10603 | 10433 | 9062 | — | — |
| Elongation (%@6.8 Kg/25 mm) | | | | | | | | |
| warp direction | — | — | — | — | — | — | 38 | — |
| weft direction | — | — | — | — | — | — | — | 86 |
| vertical direction | 20 | 23 | 26 | 18 | 25 | 21 | — | — |
| horizontal direction | 46 | 34 | 33 | 60 | 41 | 47 | — | — |
| threads/cm - warp | 11.0 | 14.6 | 15.0 | 13.0 | 14.1 | — | 25.0 | 22.0 |
| thread/cm - weft | 11.2 | 15.5 | 16.1 | 12.5 | 12.6 | — | 25.0 | 25.7 |
| thickness (mm) | 0.52 | 0.76 | 0.68 | 0.89 | 0.96 | 0.98 | 1.10 | 1.65 |
| weight (g/m2) | 292.0 | 365.0 | 370.6 | 376.4 | 422.1 | 484.6 | 375.8 | 482.7 |
| bias angle | | | | 78 | 79 | 84 | — | — |
| twist/cm (aramid/nylon/ply) | 0/0/2 | 0/0/2 | 0/0/2 | 0/0/2 | 0/0/3 | 0/0/3 | — | — |
| abrasion resistance (cycles) | | | | | | | | |
| smooth side | 1700 | 2000 | 2000 | 1892 | 3536 | 130k | 5740 | >51k |
| reverse side | — | — | — | 2000 | 1000 | 4035 | — | — |

4. The cover fabric of claim 1 wherein said warp yarns and said weft yarns have the same composition.

5. The cover fabric of claim 3 wherein said first filament yarn comprises aramid fibers and said second filament yarn comprises nylon fibers.

6. The cover fabric of claim 4 wherein said first filament yarn makes up more than half of the total denier of the warp and weft yarns.

7. The cover fabric of claim 1 oriented on a bias with bias angle less than 90 degrees.

8. The cover fabric of claim 1 comprising a relatively smooth side and a relatively rough side.

9. The cover fabric of claim 1 oriented on a bias with bias angle of about 80 degrees.

10. A toothed power transmission belt comprising a bias fabric covering said teeth; wherein said bias fabric is woven from nonstretchable warp yarns and weft yarns oriented at a bias angle of less than 80°; said warp yarns and weft yarns each plied from a first filament yarn and a second filament yarn; said first filament yarn having a higher tensile strength than said second filament yarn; and said fabric woven in a modified twill pattern.

11. The belt of claim 10 wherein the modified twill pattern comprises one or more rows of 1/1 or 2/1 plain weave alternating with one or more rows of a 1/3 or 1/4 or 2/4 satin weave.

12. The belt of claim 10 wherein the bias fabric is woven with alternating rows of a plain weave and a satin weave.

13. The belt of claim 10 wherein said warp yarns and weft yarns are each plied with a final twist in the range of 1.0 to 5.0 twists per cm.

14. The belt of claim 10 wherein said warp yarns and said weft yarns have the same composition.

15. The belt of claim 10 wherein said first filament yarn comprises aramid fibers and said second filament yarn comprises nylon fibers.

16. The belt of claim 15 wherein said first filament yarn makes up more than half of the total denier of the warp and weft yarns.

17. The belt of claim 10 oriented on a bias with bias angle less than 90 degrees.

18. The belt of claim 10 comprising a relatively smooth side and a relatively rough side.

* * * * *